United States Patent
Tinnin et al.

(10) Patent No.: US 11,884,316 B2
(45) Date of Patent: Jan. 30, 2024

(54) AXIALLY ADJUSTABLE STEERING COLUMN ASSEMBLY

(71) Applicant: Steering Solutions IP Holding Corporation, Saginaw, MI (US)

(72) Inventors: Melvin Tinnin, Clio, MI (US); Zachery Schultz, Munger, MI (US); Joen Bodtker, Gaines, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/961,088

(22) Filed: Oct. 6, 2022

(65) Prior Publication Data

US 2023/0126450 A1 Apr. 27, 2023

Related U.S. Application Data

(60) Provisional application No. 63/272,371, filed on Oct. 27, 2021.

(51) Int. Cl.
*B62D 1/181* (2006.01)
*B62D 1/185* (2006.01)

(52) U.S. Cl.
CPC ............. *B62D 1/181* (2013.01); *B62D 1/185* (2013.01)

(58) Field of Classification Search
CPC ......... B62D 1/181; B62D 1/185; B62D 1/183
See application file for complete search history.

(56) References Cited

U.S. PATENT DOCUMENTS

| 5,737,971 | A | * | 4/1998 | Riefe | F16C 33/32 |
| | | | | | 384/49 |
| 2020/0269900 | A1 | * | 8/2020 | Kawaguchi | F16C 1/12 |

FOREIGN PATENT DOCUMENTS

| CN | 114954622 A | * | 8/2022 | ............. B62D 1/181 |
| CN | 115195846 A | * | 10/2022 | |
| DE | 102018212739 A1 | * | 2/2020 | |
| DE | 102020205730 A1 | * | 11/2021 | ............. B62D 1/185 |
| KR | 20210101735 A | * | 8/2021 | |
| KR | 20230071286 A | * | 5/2023 | |

* cited by examiner

*Primary Examiner* — Drew J Brown
(74) *Attorney, Agent, or Firm* — Dickinson Wright PLLC

(57) ABSTRACT

A steering column assembly includes a steering column extending along a longitudinal axis between a first end and a second end. The steering column includes an outer jacket located at the first end, a middle jacket telescopically connected to the outer jacket and extending towards the second end, and an inner jacket telescopically connected to the middle jacket and extending further towards the second end. The steering column assembly also includes at least one axial adjustment actuator that telescopically moves the middle jacket with respect to the outer jacket. The at least one axial adjustment actuator includes a first gear rack fixed to the outer jacket and a second gear rack fixed to the inner jacket, at least one gear located between, and in tooth meshed engagement with, the first gear rack and the second gear rack and driven to translate the inner jacket relative to the outer jacket.

13 Claims, 7 Drawing Sheets

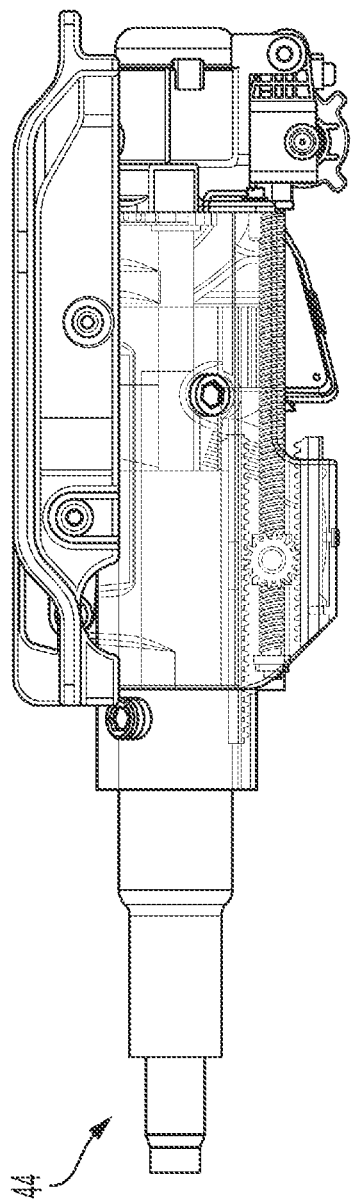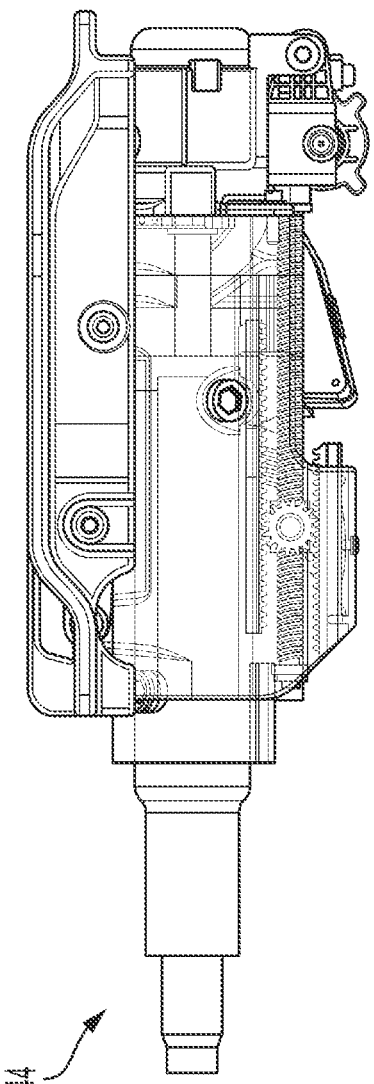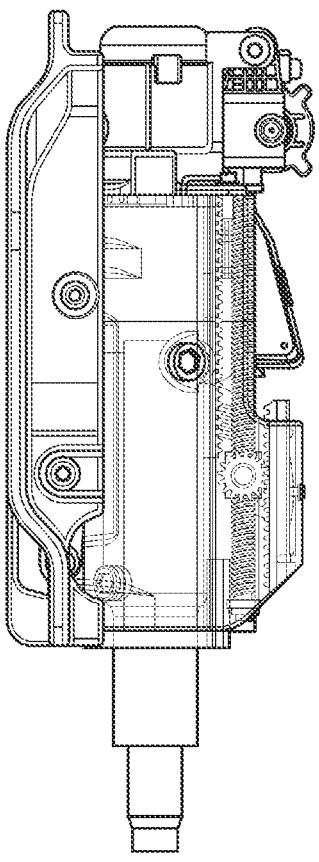

AXIALLY ADJUSTABLE STEERING COLUMN ASSEMBLY

CROSS-REFERENCE TO RELATED APPLICATION

This patent application claims the benefits of priority to U.S. Patent Application Ser. No. 63/272,371, filed Oct. 27, 2021, the disclosure of which is incorporated by reference herein in its entirety.

FIELD OF THE INVENTION

The embodiments described herein relate to vehicle steering systems and, more particularly, to a steering column that is axially extendable and retractable.

BACKGROUND

Conventional steering columns can be manually operated or electronically adjusted via actuators. Depending on the user requirements, such columns can be adjusted in various directions, including along the axis of the steering column and/or rake directions. Steering columns can move axially in several ways. For example, some steering columns telescope via telescoping jackets or shafts or may include one jacket or shaft that is slidable on a track and rail system of another component of the steering column.

Power axially adjustable steering columns typically have one actuator and two telescopic jackets. One jacket is usually pinned at the rake pivot point, and the other jacket can translate with the hand wheel. The actuator can adjust two jackets relative to each other to provide the telescope function of the hand wheel. Conventional solutions have limitations. Telescopic steering columns can increase the amount of space required by the steering column assembly to operate in the underlying structure. As some end use applications are actually decreasing the space available for steering column assembles, the existing telescopic solutions are becoming an issue. Moreover, when the telescopic jackets are moved, typically, a transition period occurs as the outer jacket stops movement and the inner jacket starts and/or continues movement. This transition period often creates unwanted noise. In addition, moving both the inner jacket and the outer jacket independently often results in the telescopic adjustment being slow.

In the past, a function of telescoping steering columns was to provide flexibility in the location of the hand wheel and facilitate more comfortable driving positions for different sizes of drivers. Recently, there have been opportunities for significantly more telescopic travel, which also may be referred to as stow travel (i.e., when the hand wheel is not needed). For example, the hand wheel could be significantly repositioned away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode.

Accordingly, there is a continuing desire to provide a steering column assembly that is quiet, provides a large range of axial adjustment, and that provides faster axial adjustment.

SUMMARY

According to one aspect of the disclosure, a steering column assembly includes a steering column extending along a longitudinal axis between a first end and a second end. The steering column includes an outer jacket located at the first end, a middle jacket telescopically connected to the outer jacket and extending towards the second end, and an inner jacket telescopically connected to the middle jacket and extending further towards the second end. The steering column assembly also includes at least one axial adjustment actuator that telescopically moves the middle jacket with respect to the outer jacket. The at least one axial adjustment actuator includes a first gear rack fixed to the outer jacket and a second gear rack fixed to the inner jacket, at least one gear located between, and in tooth meshed engagement with, the first gear rack and the second gear rack and driven to translate the inner jacket relative to the outer jacket.

According to another aspect of the disclosure, an axial adjustment actuator assembly for a steering column having an outer jacket, a middle jacket and an inner jacket is provided. The axial adjustment actuator assembly includes a motor. The axial adjustment actuator assembly also includes a lead screw rotatably drive by the motor. The axial adjustment actuator assembly further includes a nut axially driven along the lead screw during rotation of the lead screw and connected to the middle jacket to axially translate the middle jacket at a middle jacket speed. The axial adjustment actuator assembly yet further includes a gear operatively coupled to the nut and engaged with the inner jacket and the outer jacket, wherein the gear translates the inner jacket at an inner jacket speed that is different than the middle jacket speed.

According to yet another aspect of the disclosure, a steering column assembly includes a steering column extending along a longitudinal axis between a first end and a second end. The steering column includes an outer jacket located at the first end, a middle jacket telescopically connected to the outer jacket and extending towards the second end, and an inner jacket telescopically connected to the middle jacket and extending further towards the second end. The steering column assembly also includes at least one axial adjustment actuator assembly. The at least one axial adjustment actuator assembly includes a motor. The at least one axial adjustment actuator assembly also includes a lead screw rotatably drive by the motor. The at least one axial adjustment actuator assembly further includes a nut axially driven along the lead screw during rotation of the lead screw and connected to the middle jacket to axially translate the middle jacket at a middle jacket speed. The at least one axial adjustment actuator assembly yet further includes an axial speed control component operatively coupled to the nut and engaged with the inner jacket and the outer jacket, wherein the axial speed control component translates the inner jacket at an inner jacket speed that is different than the middle jacket speed.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 7A through 7C is another sequential illustration of the steering column assembly adjusted between the fully expanded state (as shown in FIG. 4) and the stowed state.

DETAILED DESCRIPTION

Figure 1:
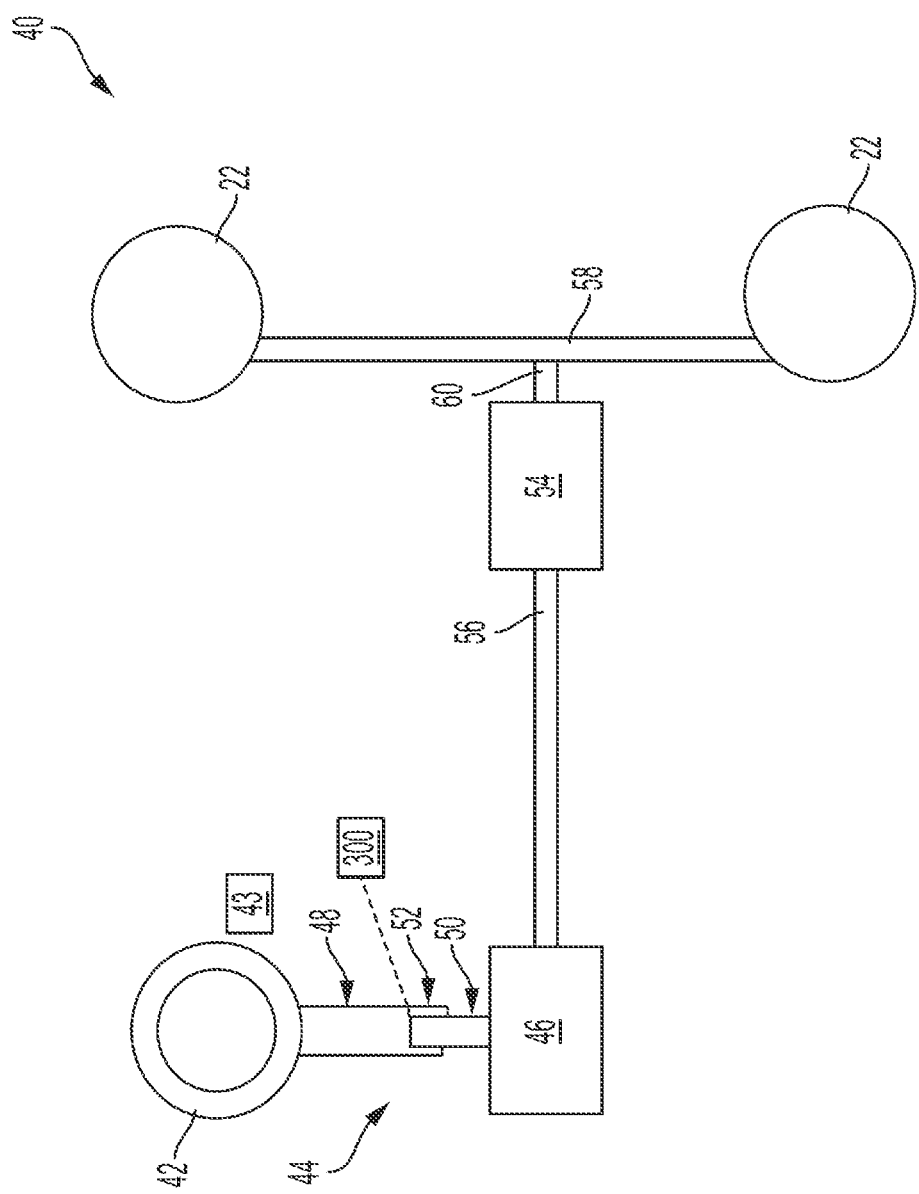
FIG. 1 schematically illustrates a steering system of the vehicle according to the principles of the present disclosure.

Referring now to the drawings, where the various embodiments are shown and described herein, without limiting same, FIGS. 1-7C illustrate embodiments of a system, method and apparatus for a steering column assembly that permits rake and axial movement. The axial movement includes two or more jackets that move in a telescopic, sliding, or translationally relative movement.

In some embodiments, a vehicle may further include a steering system 40 as is generally illustrated in FIG. 1. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include a first portion 48 and a second portion (also referred to as "jackets" herein) that are permitted to move axially with respect to one another. The axial movement may include sliding, telescopic, translating, and other axial movements. The steering column assembly 44 may include additional portions that permit axial movement and brackets that provide rake and tilt movement. An axial adjustment actuator 52 may be located on one or each of the first portion 48, the second portion 50, and any brackets, and provide at least one of expansion and contraction of the steering column assembly 44 along the axis. As will be described in greater detail below, behavior of the axial adjustment actuator 52 may be controlled via a control system 300.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axel 58 via a output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axel to turn the wheels 22.

Figure 2:
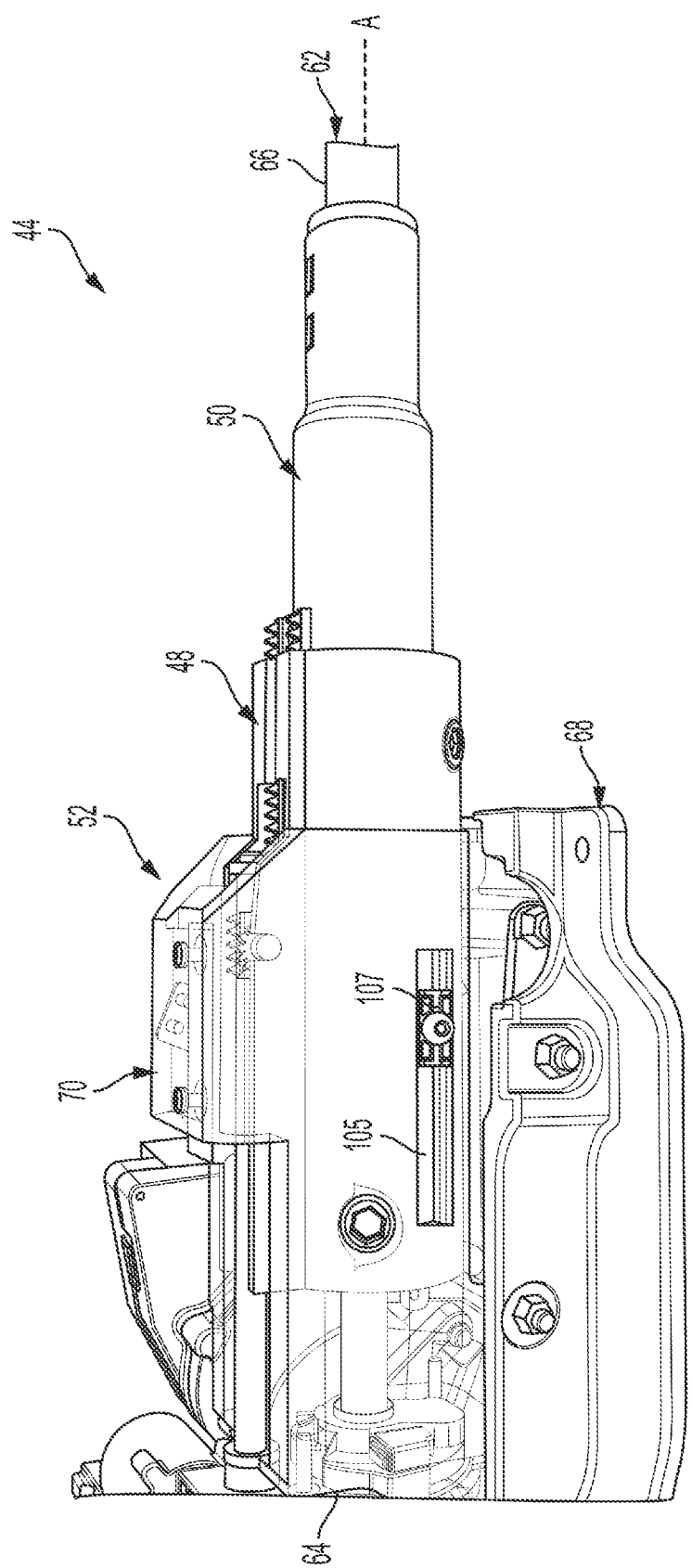
FIG. 2 is an isometric, partially transparent view of a steering column assembly including a steering column extending along a longitudinal axis.

With reference now to FIG. 2, the steering column assembly 44 is isometrically illustrated. The steering column assembly 44 includes a steering column 62 extending along a longitudinal axis A between a first end 64 and a second end 66. The steering column assembly 44 includes a rake bracket assembly 68 located between the first end 64 and the second end 66. The rake bracket assembly 68 facilitates rake movement of the steering column 62 about a pivot axis, which is disposed transverse to the longitudinal axis A.

With continued reference to FIG. 2, the steering column 62 may be axially adjustable and include the first jacket 48 (also may be referred to herein as "a middle jacket") and the second jacket 50 (also may be referred to herein as "an upper jacket") that are permitted to move axially with respect to one another. The first jacket 48 and the second jacket 50 may be disposed about the longitudinal axis A and axially moveable therealong via the axial adjustment actuator 52. In some embodiments, the axial adjustment actuator 52 is configured to move the first jacket 48 in a first axial direction and the second jacket 50 a second axial direction that is opposite the first axial direction.

Figure 3:
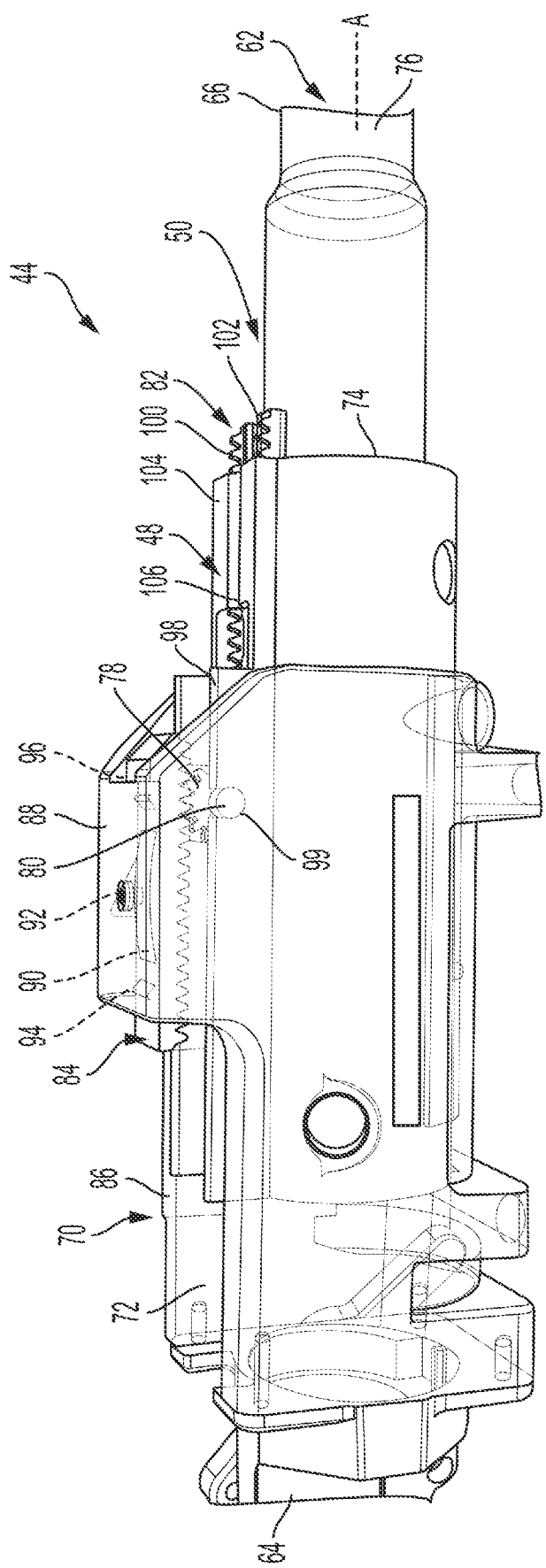
FIG. 3 is another isometric, partially transparent view of the steering column assembly illustrating that the steering column includes a pair of telescoping jackets and an axial adjustment actuator that that moves the telescopic jackets relative to one another along the longitudinal axis.

With reference now to FIG. 3, the steering column assembly 44 may further include an outer jacket 70 (may also be referred to herein as "a lower jacket"), which may be connected to the rake bracket assembly 68 and may be axially fixed relative to the vehicle. In other words, the outer jacket 70 is grounded to a stationary structure of the vehicle, with the first jacket 48 and the second jacket 50 axially adjustable relative to the outer jacket 70. The outer jacket 70 may include a bracket channel 72 for locating the first jacket 48 and the second jacket 50. In some embodiments, the first jacket 48 may define a first chamber 74 and the second jacket 50 may define a second chamber 76. In operation, the first jacket 48 is sized for slidable movement within the bracket channel 72 of the outer jacket 70, the second jacket 50 is sized for slidable movement within the first chamber 74 of the first jacket 48, and portions of the steering column 62 sized for locating within the second chamber 76. The steering column 62 may be fixedly engaged with the second jacket 50, such that it axially travels therewith during actuation via the axial adjustment actuator 52.

With continued reference to FIGS. 2 and 3, the axial adjustment actuator 52 may include a gear 78 that is driven for rotation about a fixed pin 80. The gear 78 may be any suitable type of gear, such as a pinion gear, a spur gear or the like. A first gear rack 82 may be located on the second jacket 50 and a second gear rack 84 may be located on the outer jacket 70. The first gear rack 82 and the second gear rack 84 may be in meshed engagement with the gear 78 on opposite sides of the gear 78. As such, when the gear 78 is driven for rotation about the fixed pin 80, the first gear rack 82 and the second gear rack 84 are pushed in opposite directions.

More particularly, the outer jacket 70 may define a pair of outer sidewalls 86 that extend along an open side of the bracket channel 72. The outer sidewalls 86 may merge at an outer bridge portion 88 and the second gear rack 84 may be located on an inner surface of the outer bridge portion 88 with teeth oriented towards the axis A. The second gear rack 84 may be connected to the outer bridge portion 88 via a band 90 formed on second gear rack 84 that is connected to the outer bridge portion 88 via one or more mechanical fasteners 92 and one or more clips 94. It is to be appreciated that the second gear rack 84 may be coupled to the outer bridge portion 88 in any alternative suitable manner. The second gear rack 84 may include one or more flanged ends 96 that overlaps the outer bridge portion 88. The first jacket 48 may further define a pair of middle sidewalls 98 that fit into a longitudinal space defined by the outer sidewalls 86 and permit relative sliding movement. The pair of middle sidewalls 98 may further extend along an open end of the first chamber 74. The first gear rack 82 may be attached to an outer surface of the second jacket 50 and located in a space between the middle sidewalls 98.

The first gear rack 82 may include two sequences of axially aligned rack teeth 100 along longitudinal edges thereof that are spaced by a flat section 102. The middle sidewalls 98 may extend to a middle bridge portion 104 that defines an inward projection 106 that extends along the axis between the rack teeth 100. It should be appreciated that the middle sidewalls 98 may be guided by the outer sidewalls 88 and the rack teeth 100 may be guided on opposite sides of inward projection 106 to limit unwanted rotation between parts. In addition, the first jacket 48 may include a channel 105 and the second jacket 50 may include a guide pin 107 extending therefrom (FIG. 2) that travels along the channel 105 during expansion and contraction of the steering column assembly 44 during axial adjustment to further limit unwanted rotation between parts. In some embodiments, the middle sidewalls 98 may include an opening 99 for holding opposite ends of the fixed pin 80.

In some embodiments, one or both of the first gear rack 82 and the second gear rack 84 may be further configured as an energy absorbing strap. As such, upon receiving a compressive force, the gear 78 may become rotationally locked and deform one or both of the first gear rack 82 (e.g., the band 90) and the second gear rack 84 via elongation and/or the like.

Figure 4:
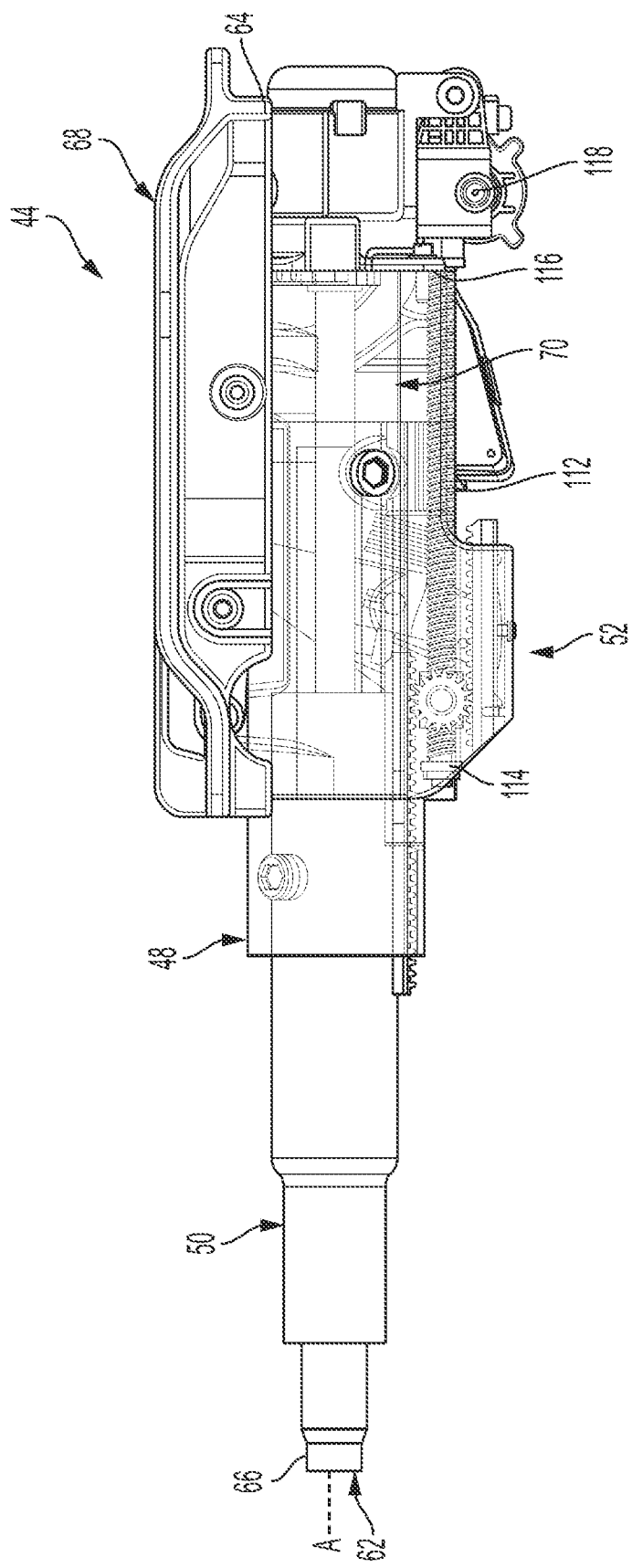
FIG. 4 is a side view of the steering column in a fully expanded state.
Figure 5:
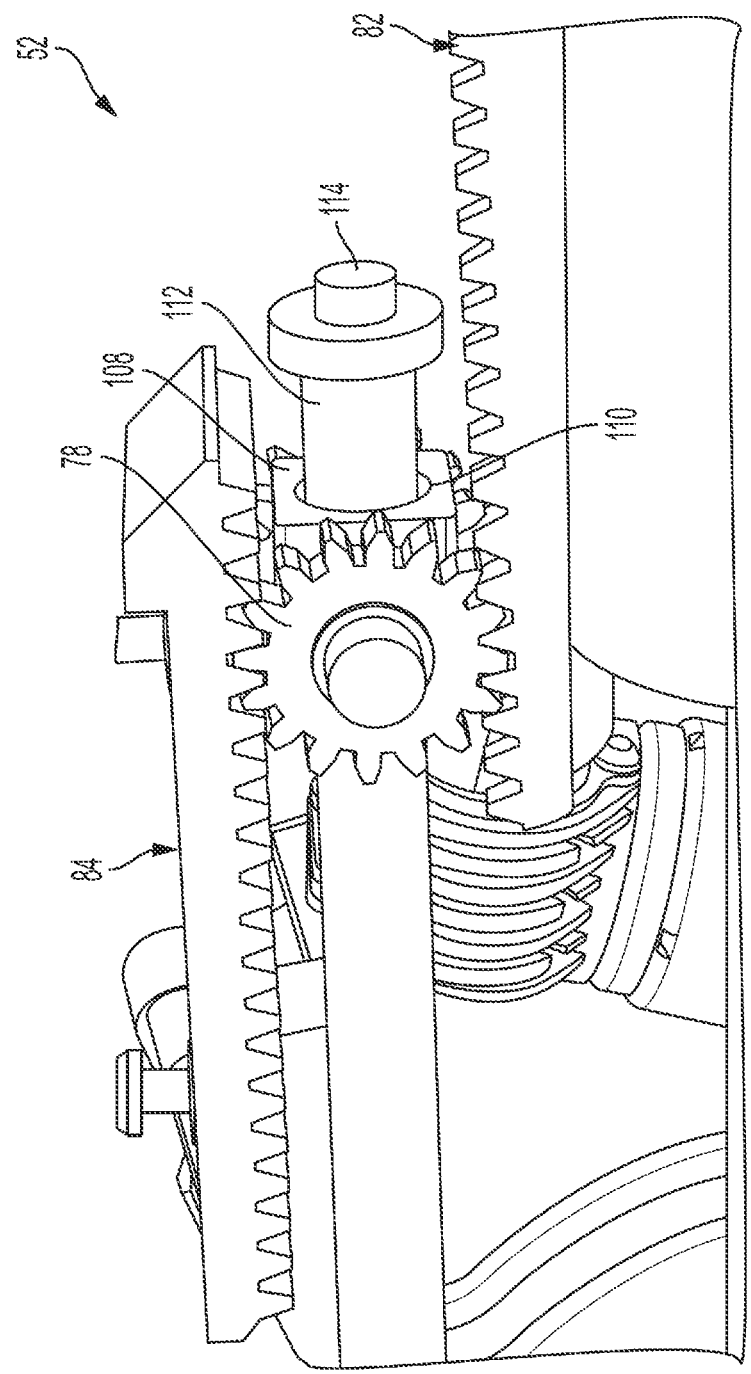
FIG. 5 is a perspective view of the axial adjustment actuator.

With reference now to FIGS. 4 and 5, the gear 78 may include a pair of gears 78 located on opposite sides of a driven nut 108. The driven nut 108 may include the fixed pin 80 (e.g., a pair of pins) extending from opposite sides thereof and may further include an aperture 110 oriented generally coaxially with the axis A. A lead screw 112 may extend between a floating end 114 and a fixed end 116 and through the aperture 110 in the driven nut 108. In some embodiments, the floating end 114 is located between the middle sidewalls 98 and the fixed end 116 is located in a power unit 118 of the axial adjustment actuator 52. The power unit 118 may include a motor that rotates the lead screw 112. As illustrated in FIG. 4, the lead screw 112 may be configured as a lead screw and define helically arranged teeth that intermesh with helically arranged teeth in the aperture 110 in the driven nut 108. The motor may directly rotate the lead screw 112 or may rotate the lead screw 112 via a gear arrangement (not shown). In operation, the power unit 118 rotates the lead screw 112 causing the driven nut 108 to travel along the axis with respect to the axis A. Axial travel of the driven nut 108 causes rotation of the gear 78, wherein the first gear rack 82 is located on one side of the gear 78 and pushed in one axial direction by intermeshed teeth and the second gear rack 84 is located on an opposite side of the gear 78 and pushed in an opposite axial direction by intermeshed teeth.

Figure 6A:
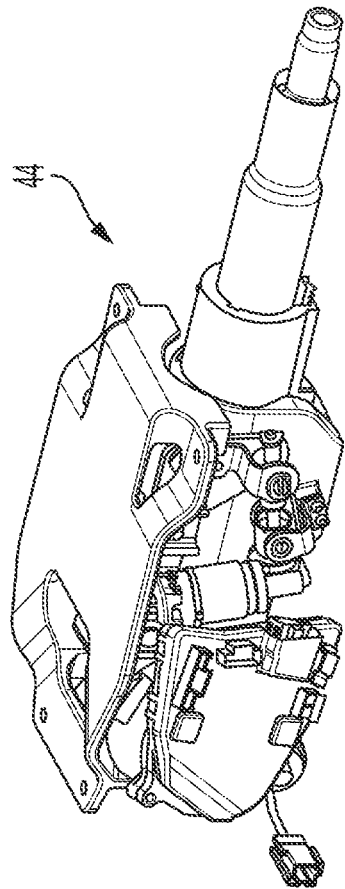
FIGS. 6A through 6D sequentially illustrate the steering column assembly adjusted between the fully expanded state and a stowed state.
Figure 6B:
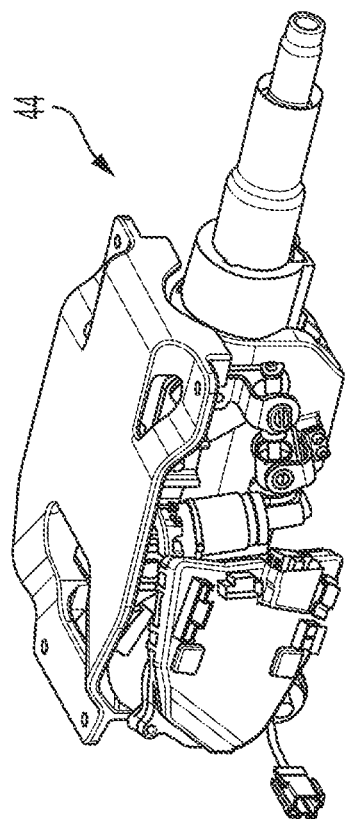
Figure 6C:
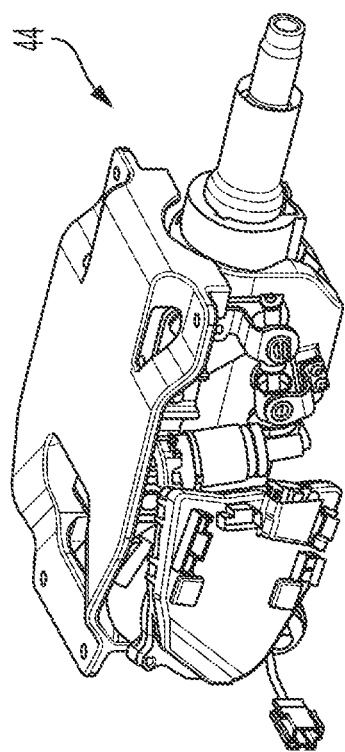
Figure 6D:
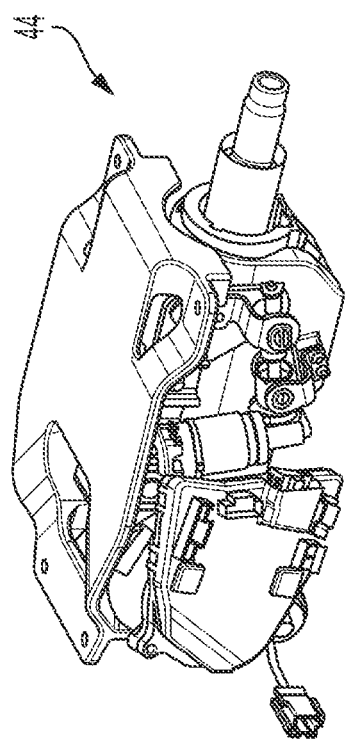

FIGS. 6A through 6D sequentially illustrate the steering column assembly 44 adjusted between the fully expanded state (FIG. 6A) and a stowed state (FIG. 6D). More particularly, FIG. 6A illustrates the steering column assembly 44 in the fully expanded state, FIG. 6B illustrates the steering column assembly 44 in a first retracted position, FIG. 6C illustrates the steering column assembly 44 in a second retracted position that is further retracted than the first, and FIG. 6D illustrates the steering column assembly 44 in the stowed or fully retracted position.

FIGS. 7A through 7C is another sequential illustration of the steering column assembly 44 adjusted between the fully expanded state (as shown in FIG. 4) and the stowed state (FIG. 7C). FIG. 7B illustrates the steering column assembly 44 in a first retracted position and FIG. 7C illustrates the steering column assembly 44 in a second retracted position that is further retracted than the first.

It should be appreciated that some arrangements of the steering column assembly 44 can include two or more actuators and/or three or more jackets. These designs can increase the amount of stow capability compared to conventional steering columns for a given package space. The steering column assembly 44 can increase the amount of stow capability with a shorter lead screw 112 that can be achieved for any vehicle compared to a conventional telescoping mechanism. Moreover, the axial expansion of the steering column assembly 44 is increased as actuation moves both the first portion 48 and the second portion 50 in unison. In some embodiments, the teeth on the first gear rack 82 are sized differently than the rack teeth 100 on the second gear rack 84, such that actuation moves the first portion 48 at a first speed and the second portion 50 at a second rate that is different than the first rate. In some embodiments, the first rate is slower than the second rate. For example, actuation by the axial adjustment actuator 52 may result in the second jacket 50 translating at about twice the speed of the first jacket 48. However, the relative tooth profiles of the first gear rack 82 and the second gear rack 84 may be customized to achieve any desired relative speed ratio. The steering column assembly 44 eliminates the transition period and associated noise as both the first portion 48 and the second portion 50 move simultaneously rather than in independent steps. Moreover, because the teeth on the first gear rack 82 and the rack teeth 100 on the second gear rack 84 are always intermeshed, axial translation is locked unless otherwise actuated.

Although described herein and illustrated in the figures as having the axial adjustment actuator 52 operatively coupled to the outer jacket 70, it is to be appreciated that the axial adjustment actuator 52 may be mounted to an emulator housing (not shown) or bracket that attaches to the outer jacket 70. Therefore, the axial adjustment actuator 52 may be mounted to the emulator housing, directly to the outer jacket 70, or indirectly to the outer jacket 70.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:
1. A steering column assembly comprising:
   a steering column extending along a longitudinal axis between a first end and a second end;
   the steering column including an outer jacket located at the first end, a middle jacket telescopically connected to the outer jacket and extending towards the second end, and an inner jacket telescopically connected to the middle jacket and extending further towards the second end;

at least one axial adjustment actuator that telescopically moves the middle jacket with respect to the outer jacket; and wherein the at least one axial adjustment actuator includes a first gear rack fixed to the outer jacket and a second gear rack fixed to the inner jacket, at least one gear located between, and in tooth meshed engagement with, the first gear rack and the second gear rack and driven to translate the inner jacket relative to the outer jacket, wherein the axial adjustment actuator further comprises:

a motor;

a lead screw rotatably drive by the motor;

a nut axially driven along the lead screw during rotation of the lead screw; and wherein the at least one gear is operatively coupled to the nut, wherein the nut includes a pair of pins extending from opposite sides of the nut, each of the pair of pins connected to the middle jacket.

2. The steering column assembly of claim 1, wherein a plurality of teeth on the second gear rack are sized to translate the inner jacket at an inner jacket speed that is different than a middle jacket speed of translation.

3. The steering column assembly of claim 2, wherein the inner jacket speed is faster than the middle jacket speed.

4. The steering column assembly of claim 2, wherein the inner jacket speed is twice as fast as the middle jacket speed.

5. The steering column assembly of claim 1, wherein the nut includes a pair of pins extending from opposite sides of the nut, each of the pair of pins connected to the middle jacket.

6. The steering column assembly of claim 5, wherein the at least one gear comprises a pair of gears, each of the pair of gears connected to the nut with a respective one of the pair of pins.

7. The steering column assembly of claim 1, wherein the at least one gear is one of a pinion gear and a spur gear.

8. An axial adjustment actuator assembly for a steering column having an outer jacket, a middle jacket and an inner jacket, the axial adjustment actuator assembly comprising:

a motor;

a lead screw rotatably drive by the motor;

a nut axially driven along the lead screw during rotation of the lead screw and connected to the middle jacket to axially translate the middle jacket at a middle jacket speed; and a gear operatively coupled to the nut and engaged with the inner jacket and the outer jacket, wherein the gear translates the inner jacket at an inner jacket speed that is different than the middle jacket speed, wherein the nut includes a pair of pins extending from opposite sides of the nut, each of the pair of pins connected to the middle jacket.

9. The axial adjustment actuator assembly of claim 8, wherein the gear is engaged with a first gear rack fixed to the outer jacket and a second gear rack fixed to the inner jacket, the gear in tooth meshed engagement with the first gear rack and the second gear rack and driven to translate the inner jacket relative to the outer jacket.

10. The axial adjustment actuator assembly of claim 8, wherein the inner jacket speed is faster than the middle jacket speed.

11. The axial adjustment actuator assembly of claim 8, wherein the inner jacket speed is twice as fast as the middle jacket speed.

12. The axial adjustment actuator assembly of claim 8, wherein the gear is a first gear and the axial adjustment actuator assembly comprises a second gear, each of the first and second gears connected to the nut with a respective one of the pair of pins.

13. The axial adjustment actuator assembly of claim 8, wherein the gear is one of a pinion gear and a spur gear.

\* \* \* \* \*